(12) United States Patent
Page et al.

(10) Patent No.: US 7,881,546 B2
(45) Date of Patent: Feb. 1, 2011

(54) SLAB-BASED PROCESSING ENGINE FOR MOTION VIDEO

(75) Inventors: Neal S. Page, Cary, NC (US); Scott C. Labrozzi, Cary, NC (US); Gary K. Shaffer, Apex, NC (US); Philip G. Jacobsen, Durham, NC (US)

(73) Assignee: Inlet Technologies, Inc., Cary, NC (US)

( * ) Notice: Subject to any disclaimer, the term of this patent is extended or adjusted under 35 U.S.C. 154(b) by 1873 days.

(21) Appl. No.: 10/935,991

(22) Filed: Sep. 8, 2004

(65) Prior Publication Data

US 2006/0050971 A1 Mar. 9, 2006

(51) Int. Cl.
G06K 9/36 (2006.01)
G06K 9/46 (2006.01)

(52) U.S. Cl. .................... 382/234; 382/303; 382/304

(58) Field of Classification Search .............. 382/234, 382/236, 248, 303, 304; 375/240.01, 240.18, 375/240.24
See application file for complete search history.

(56) References Cited

U.S. PATENT DOCUMENTS

| | | | |
|---|---|---|---|
| 5,640,210 A | 6/1997 | Knee et al. | |
| 5,701,160 A | 12/1997 | Kimura et al. | |
| 5,764,801 A * | 6/1998 | Munemasa et al. | 382/234 |
| 5,963,675 A * | 10/1999 | van der Wal et al. | 382/260 |
| 6,356,589 B1 | 3/2002 | Gebler et al. | |
| 6,754,270 B1 | 6/2004 | Golin et al. | |
| 6,850,647 B1 * | 2/2005 | Gough et al. | 382/233 |
| 2001/0005908 A1 | 6/2001 | Hodge et al. | |
| 2002/0001343 A1 | 1/2002 | Challapali et al. | |
| 2002/0040475 A1 | 4/2002 | Yap et al. | |
| 2002/0126752 A1 | 9/2002 | Kim | |
| 2002/0181587 A1 | 12/2002 | Vetro | |
| 2003/0012275 A1 | 1/2003 | Boice et al. | |
| 2003/0085902 A1 | 5/2003 | Vogelaar et al. | |
| 2003/0091115 A1 | 5/2003 | Yamana et al. | |
| 2003/0174768 A1 | 9/2003 | Hall et al. | |

FOREIGN PATENT DOCUMENTS

WO 99/38316 7/1999

OTHER PUBLICATIONS

Ahmad I. et al.; "Video Compression with Parallel Processing", Parallel Computing, 2002, pp. 1039-1078.

(Continued)

*Primary Examiner*—Phuoc Tran
(74) *Attorney, Agent, or Firm*—Myers Bigel Sibley & Sajovec (57) ABSTRACT

Systems and methods of encoding a video signal that includes a succession of images are disclosed. A system may include a plurality of independently programmable processing elements (PEs), an input interface device adapted to receive, buffer, and divide the input video signal in a manner appropriate to the plurality of PEs, and an output interface device adapted to receive encoded bitstreams generated by the plurality of PEs and provide an encoded video signal. Each PE is configurable to carry out the steps of a selected encoding algorithm and includes a digital processor and a memory in communication with the digital processor. The memories are independently accessible, and PEs communicate with each another during the encoding.

20 Claims, 4 Drawing Sheets

OTHER PUBLICATIONS

International Search Report for PCT Application No. PCT/US2005/031836; mailed on Feb. 1, 2006 (4 pgs.).

Written Opinion of the International Searching Authority for PCT Application No. PCT/US2005/031836, mailed on Feb. 1, 2006 (6 pgs.).

Examination Report for corresponding European Patent Application No. 05802648.5, issued Mar. 11, 2008, 5 pages.

Examination Report for corresponding European Patent Application No. 05802648.5, issued Jan. 16, 2009, 4 pages.

* cited by examiner

FIG. 1

| Slab 202-1 |
|---|
| Slab 202-2 |
| Slab 202-3 |
| Slab 202-4 |
| Slab 202-5 |
| Slab 202-6 |
| ... |
| Slab 202-N |

Horizontally
Oriented
Slabs

FIG. 2A

| Slab 212-1 | Slab 212-2 |
|---|---|
| Slab 212-3 | Slab 212-4 |
| Slab 212-5 | Slab 212-6 |
| Slab 212-7 | Slab 212-8 |
| Slab 212-9 | Slab 212-10 |
| Slab 212-11 | Slab 212-12 |
| ... | ... |
| Slab 212-N-1 | Slab 212-N |

Vertical Columns of
Horizontally Oriented
Slabs

SLAB-BASED PROCESSING ENGINE FOR MOTION VIDEO

This application relates to motion video signal processing methods and apparatus and more particularly to methods and apparatus for motion video encoding and even more particularly to high definition (HD) motion video processing in real time.

BACKGROUND

Standard definition (SD) television (TV) images may be broadcast as images of 640 pixels×480 lines, or 4:3 aspect ratio, that vertically refresh at 24, 30, or 60 images, or frames, per second. HD TV images include much more data than SD TV images. An HD TV image has a 16:9 aspect ratio and may include, for example, either 1920 pixels×1080 lines that are interlacedly scanned or 1280 pixels×720 lines that are progressively scanned. Each video frame, or image, in an interlaced system consists of two fields that are transmitted at twice the frame rate.

Encoding algorithms, such as MPEG-2, have been developed for SD video and audio signals and have been standardized by the Moving Pictures Experts Group (MPEG), which is officially designated ISO/IEC JTC1/SC29 WG11. MPEG-2, for example, is published as ISO standard 13818 and is used for digital SD TV signals and HD TV signals.

Information to be encoded with the MPEG-2 algorithm may be an analog video sequence of frames that have a pre-set pixel resolution at a pre-set frame rate, such as 29.97 frames/second with audio. The resulting MPEG-2 bitstream is a series of data frames that are encoded, e.g., compressed, versions of respective input images and sounds.

A video image input to the MPEG-2 algorithm is separated into a luminance (Y) channel that represents brightness information in the image and two chrominance (U, V) channels that represent color information in the image. An input image is also divided into "macroblocks", with each macroblock comprising four 8-pixel×8-pixel luminance blocks and, depending on the image's chrominance format, a number of 8-pixel×8-pixel chrominance blocks. For example, a macroblock may include six blocks: four luminance blocks for the Y channel and one chrominance block for each of the U and V channels. An 8×8 discrete cosine transform (DCT) is applied to each macroblock. The resulting DCT coefficients are then quantized, re-ordered to increase the occurrence of long runs of zeroes, and run-length coded. Run-length coding compresses the image by storing runs of data (i.e., sequences of the same data value) as single data values and associated counts. The result is then Huffman-coded.

The bitstream generated by an MPEG-2 encoder is organized into frames that are intra coded (I-pictures), forward predictive coded (P-pictures), or bidirectional predictive coded (B-pictures). I-pictures in an MPEG-2 bitstream result from encoding actual input images. P- and B-pictures result from motion-compensating input images before encoding. Motion compensation involves correlating an input image with the previous image, for P- and B-pictures, and with the next image, for B-pictures. Thus, each macroblock in a P- or B-picture is associated with an area in the next and/or previous image that is well-correlated with it. A "motion vector" that maps the macroblock to its correlated area is encoded, and then the difference between the two areas is encoded. It will be appreciated that adjacent frames in a video stream can be well correlated, and so P-pictures may have 90% less data than I-pictures and B-pictures may have 98% less data than I-pictures. On the other hand, an encoder needs significantly more time to encode B-pictures than it does to encode I-pictures.

The frames in an MPEG-2 bitstream are arranged in a specified order that is called a group of pictures (GOP). The ratio of I-, P-, and B-pictures in the GOP structure is determined by the nature of the input video stream, the bandwidth constraints on the output stream, and the encoding time, which can limit the use of the MPEG-2 algorithm in real-time environments having limited computing resources. Encoding time becomes an even more serious problem when the MPEG-2 and similar algorithms are used for encoding signals, such as HD signals, that have much higher resolution and therefore much higher data rates than SD formats.

Despite these problems, MPEG-2 encoding has been applied to HD video signals. For example, U.S. Patent Application Publication No. 20030174768 states that it describes a system and method for processing an HD TV image, and these involve six programmable encoders that are connected in parallel. According to the Publication, each encoder receives the HD TV at a data rate of 74.25 megahertz (MHz) and processes a respective vertical portion of each HD TV image. The encoders do not communicate with one another, so the portion processed by one encoder overlaps the adjacent portion(s) processed by other encoder(s). This facilitates assembly of complete encoded images but is inefficient at least in that the overlapping portions of each image are encoded twice.

MPEG-2 encoding was developed in 1994, and newer, more advanced, and more computationally complex algorithms have been developed that are substantially more efficient in compressing motion video, i.e., video with relative movement between camera and scene. These advanced algorithms include MPEG-4 part 10 and the advanced video codec (AVC) of MPEG-4, Windows Media 9 (WM9) that is promulgated by Microsoft Corp., and WM9 as adapted and standardized by the Society of Motion Picture and Television Engineers (SMPTE), currently identified as VC9 or VC1. The efficiencies of these advanced algorithms reduce the bandwidth needed for encoded high-resolution video, thereby making high-resolution video less expensive and easier to transmit, store, and manipulate.

In general, these advanced compression formats are based on the idea of encoding SD video using one, two, or four processors. Such processor arrangements are commonly found in today's personal computers (PCs) and server computers. A WM9 encoder, for example, can beneficially use two or four multi-threaded processors that share a memory and that are necessarily synchronized to enable generation of a single output encoded data stream. Like an MPEG-2 encoder, a WM9 encoder generates I-, P-, and B-pictures, but some of WM9's advantages arise from how the images and motion vectors are encoded.

Nevertheless, if WM9, for example, is to be used to encode HD video signals, today's PCs and servers are unable to do the encoding in real time, i.e., fast enough to keep up with the input frame rate. A single processor operating at 3.0 GHz can take up to fifty hours to encode one hour of common HD TV, depending on encoding options and image size.

Current implementation limitations restrict WM9 to use with a maximum of four processors or processing elements (PEs), which may reflect the practical consideration that PC platforms having more than four processors are currently rare at best. Modification, or porting, of WM9 to a multiprocessor array of more than four processors might be done, but although a port to, say, a hypothetical 32-processor PC would be straightforward, performance would drop off radically as contention for the one memory bus would become significant. The increased complexity of advanced encoding algorithms such as WM9 combined with the substantially greater data sizes of high-resolution video images such as HD TV makes it impractical or impossible to encode high-resolution video with an advanced encoding format such as WM9 in real time with commonly available, inexpensive processors.

This inability to process high-resolution video in real time increases the difficulty of transmitting, storing, and manipulating high-resolution video. A complete video file must be stored in an uncompressed form in a capacious storage medium, such as a video tape or one or more hard disk drives, and encoded one frame at a time. This is time-consuming and expensive, precluding the use of advanced encoding algorithms like WM9 in common broadcast-TV applications like sports events that require real-time recording and transmission, and reducing the use in non-real-time applications like non-linear editing (NLE) and authoring of digital video disks (e.g., DVDs).

SUMMARY

These and other deficiencies of previous encoding systems and methods are resolved by Applicants' invention, which in one aspect is directed to a system for processing an input video signal that includes a succession of images. The system includes a plurality of processing elements (PEs) that are each independently programmable to carry out steps of an encoding algorithm and that each include a digital processor and a memory associated with the digital processor; and an output interface device adapted to receive encoded bitstreams generated by the plurality of PEs and combine the encoded bitstreams into an encoded video signal. The memories are independently accessible by their respective digital processors. A plurality of non-overlapping portions of each image are encoded by respective PEs, and a PE encodes its respective image portion based on input image information and boundary processing of data communicated from at least one other PE. The PEs communicate with one another during encoding of the plurality of image portions.

In another aspect of Applicants' invention, there is provided a method of encoding a video signal that includes a succession of images. The method includes dividing an image into a plurality of non-overlapping image portions; encoding the image portions according to an encoding algorithm; and combining encoded image portions into an encoded video signal. An image portion is encoded by estimating motion in the image portion, transforming and quantizing the image portion, and encoding the respective transformed and quantized image portion based on necessary data of at least one neighbor image portion.

BRIEF DESCRIPTION OF THE DRAWINGS

The features, objects, and advantages of Applicants' invention will be understood by reading this description in conjunction with the accompanying drawings, in which.

DETAILED DESCRIPTION

Applicants have developed methods and apparatus that enable readily available, relatively inexpensive processors to use current and advanced encoding algorithms, such as H.264, MPEG-2, MPEG4 part 10, AVC, WM9, and VC9, for compressing high-resolution video, such as HD TV.

Rather than simply overlapping image portions and accepting the inefficiency of redundant processing, Applicants combine overall scene complexity and regional motion analysis information with boundary processing of motion vectors to produce a better result. Applicants' processors communicate with one another during the encoding of each frame, which enables reconstructed image data to be shared between adjacent image portions, or "slabs", and motion vectors to cross slab boundaries.

Applicants' inter-processor communication also enables each processor to generate its respective part of the final bitstream and the parts to be easily combined without a separate processor for that purpose. Another advantage of such communication is that the number of processors is far more scalable than prior approaches. The "cost" of such communication is additional data movement and synchronization between processors, but the amount of data transferred between processors after encoding is small.

Figure 1:
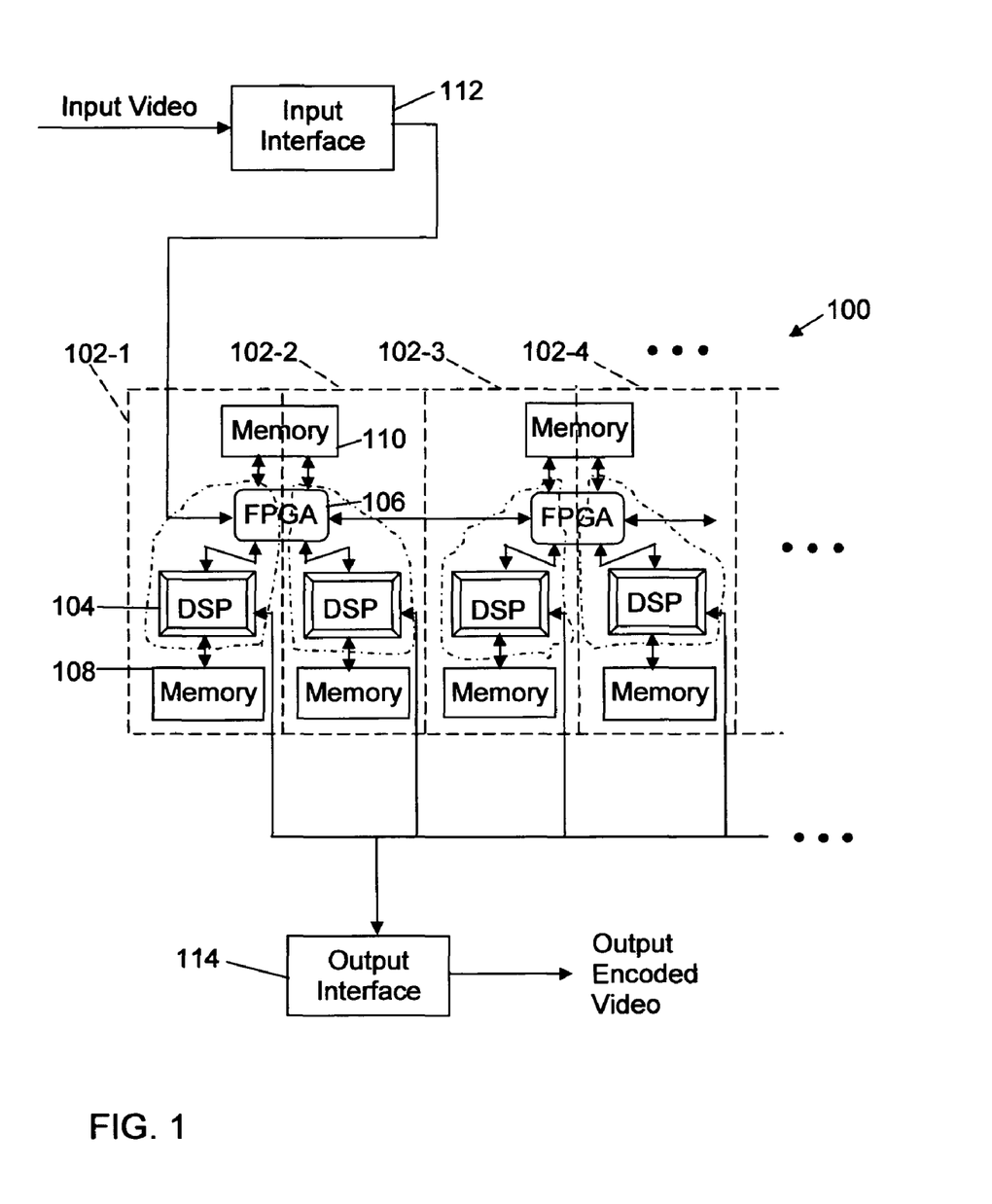
FIG. 1 is a block diagram of a media processing engine.

FIG. 1 is a block diagram of a media processing engine (MPE) 100 in accordance with Applicants' invention that includes a plurality of processing elements (PEs) 102-1, 102-2, ..., 102-$n$-1, 102-$n$, 102-$n$+1, ..., 102-N. Each of the PEs 102 includes computational circuits, logic, and memory suitable for carrying out the steps of an encoding algorithm as described in more detail below. One PE is advantageously substantially the same as another PE, and a suitable PE 102 includes a programmable processor 104, such as a digital signal processor (DSP) circuit, and a logic circuit, such as a whole or portion of a field programmable gate array (FPGA), an application-specific integrated circuit (ASIC), or other logic circuit 106. The processor 104 and FPGA 106 in a PE 102 store and retrieve information from respective memories 108, 110. It will be appreciated that the processors 104 and FPGAs 106 themselves typically include some internal memory. As indicated in FIG. 1, currently available FPGA and memory circuits can be shared between PEs 102, although it will be appreciated that the operations of any shared portions should be independent. Moreover, it will be understood that the operations of the DSPs 104 may be executed with the operations of their respective FPGA portions 106 by unitary processors that are indicated by the dotted lines and that the memories 108 may be similarly combined with their respective memory portions 110.

Suitable DSP circuits are commercially available from several suppliers, including for example Texas Instruments Inc., Dallas, Tex., and Analog Devices, Inc., Norwood Mass., and it will be understood that particular devices are selected based on their clock speed, number of processing cores, external memory bandwidth, number of multiply-and-accumulate (MAC) instructions per clock cycle, internal memory size, and connectivity to other devices (e.g., industry-standard parallel bus interfaces, serial ports, etc.), among other factors. Similarly, suitable FPGA circuits are commercially available from several suppliers, including for example Altera Corp. and Xilinx, Inc., both of San Jose, Calif., and particular devices are selected based on their maximum clock speed, number of input/output (I/O) pins, number of logic elements, and amount of internal memory, among other factors. Suitable memory circuits are commercially available from many suppliers, and particular devices are selected based on their type (e.g., synchronous dynamic random access memory (SDRAM), dual-ported RAM, double data rate (DDR) SDRAM, etc.), maximum clock speed, number of bits, and arrangement of bits, among other factors.

In Applicants' MPE 100, each PE 102 preferably has its own memory, e.g., memories 108, 110 or a unitary memory, and has access to an entire input image through communication, indicated by the double-headed arrows and bi-directional bus, with at least neighboring PEs, e.g., the DSPs and FPGAs or unitary processors in other PEs, as needed for execution of a selected encoding algorithm.

An input video bitstream, such as HD TV, or even higher-resolution video, is provided to the MPE 100 through a suitable interface 112, such as an interface that is in accordance with SMPTE 274. It will be understood that the input may be video, like HD TV, direct from an analog source (e.g., a component), digital source (e.g., a serial digital interface (SDI)), compressed digital source (e.g., transcoded from MPEG-2), or from a digital file. The interface 112 includes "glue" logic that receives the input video bitstream and provides the input video in a suitable form to at least one of the FPGAs 106 and memories 110. It is advantageously not necessary for the interface 112 to divide an input image among the number of PEs 102. As explained further below, the FPGAs 106 operate to divide the input images. It may be noted that, as depicted in FIG. 1, the interface 112 may connect to a single FPGA and that all FPGAs are connected together.

Encoded bitstreams generated by the MPE 100 are collected from the DSPs 104 and provided to subsequent devices by an output interface 114, which further provides digital data in a desired form, such as a data file on a storage medium, or a group of packets for an Ethernet interface, or any other digital form suitable for transferring data out of an encoder, such as the MPE 100. As depicted in FIG. 1, all of the PEs 102, and more particularly the DSPs 104, are connected to the output interface 114.

The independent memory devoted to each portion of an image by each PE 102 reduces processor contention for memory access, yielding better performance and/or lower cost, as cheaper memory can be used to obtain sufficient memory bandwidth. It will be appreciated that high-resolution video processing entails huge numbers of memory accesses, and so Applicants' independent memories contribute significantly to the improved performance of the MPE 100. The memories 108 typically contain program code and data, such as image slabs, and the memories 110 typically contain only data. The memories 110 are used by only the FPGAs 106 for processing, which enables the FPGAs to operate as extensions, or co-processors, of the DSPs 104. As noted above, the DSPs and FPGAs can thus be combined in unitary processors.

The architecture depicted in FIG. 1 is flexible in that the PEs 102 are readily re-partitionable to adapt to encoder input parameters, and encoding can be pipelined in that one or more PEs can start processing independent of other PEs. It will be understood that an image need not be partitioned equally across all of the PEs, and so depending on the input encoding session parameters, it can be decided to allocate more or less of the encoding burden to one or more chosen PEs. Moreover, since video data is usually delivered to the input interface and the PEs in a raster-scan order in real time, at least one of the PEs receives its slab before the other PEs do, and that PE can begin its processing before the other PEs do.

Figure 2A:
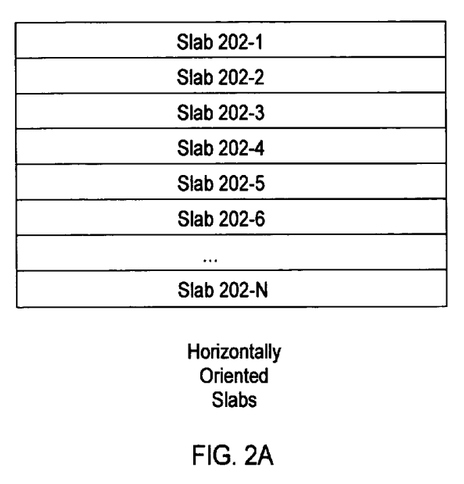
FIGS. 2A, 2B depict divisions of images into pluralities of non-overlapping "slabs" or image portions.
Figure 2B:
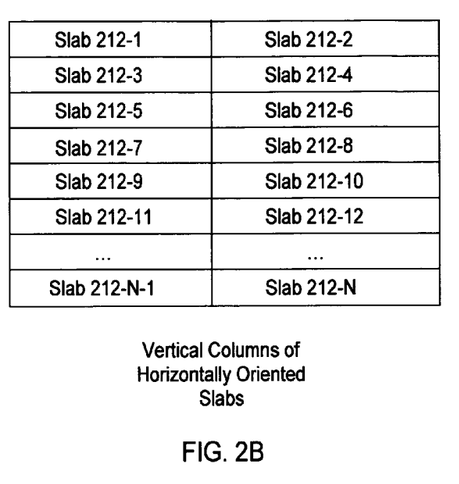

FIGS. 2A, 2B depict the division of high-resolution images 200, 210 into pluralities of non-overlapping "slabs" or image portions 202-1, 202-2, ..., 202-$n$, ..., 202-N and 212-1, 212-2, ..., 212-$n$, ..., 212-N. Slabs can generally have any shapes that tile the plane of the image, and each slab or image portion is encoded by a respective one of the PEs 102. FIGS. 2A, 2B show the slabs as non-overlapping, horizontally oriented, rectangular blocks, which are currently believed to be efficient for a rectangular-block-oriented encoding algorithm, such as MPEG-2 that performs mathematical operations on 8×8 blocks of pixels. Different slab geometries, i.e., vertical heights and horizontal widths, vertically oriented (i.e., taller than their width), horizontally oriented, and combinations, may yield different performances. For example, it may be more efficient when using horizontally oriented slabs for the heights of the slabs to be greater than the motion vector search range, which is described in more detail below. While it is possible to use any number of slabs/processors, e.g., even as many as one or more per macroblock, it is currently believed that the number may have a practical limit determined by the physical size of the PEs, the bandwidth needed for the communication among them, the cost of the PEs, etc.

Figure 3:
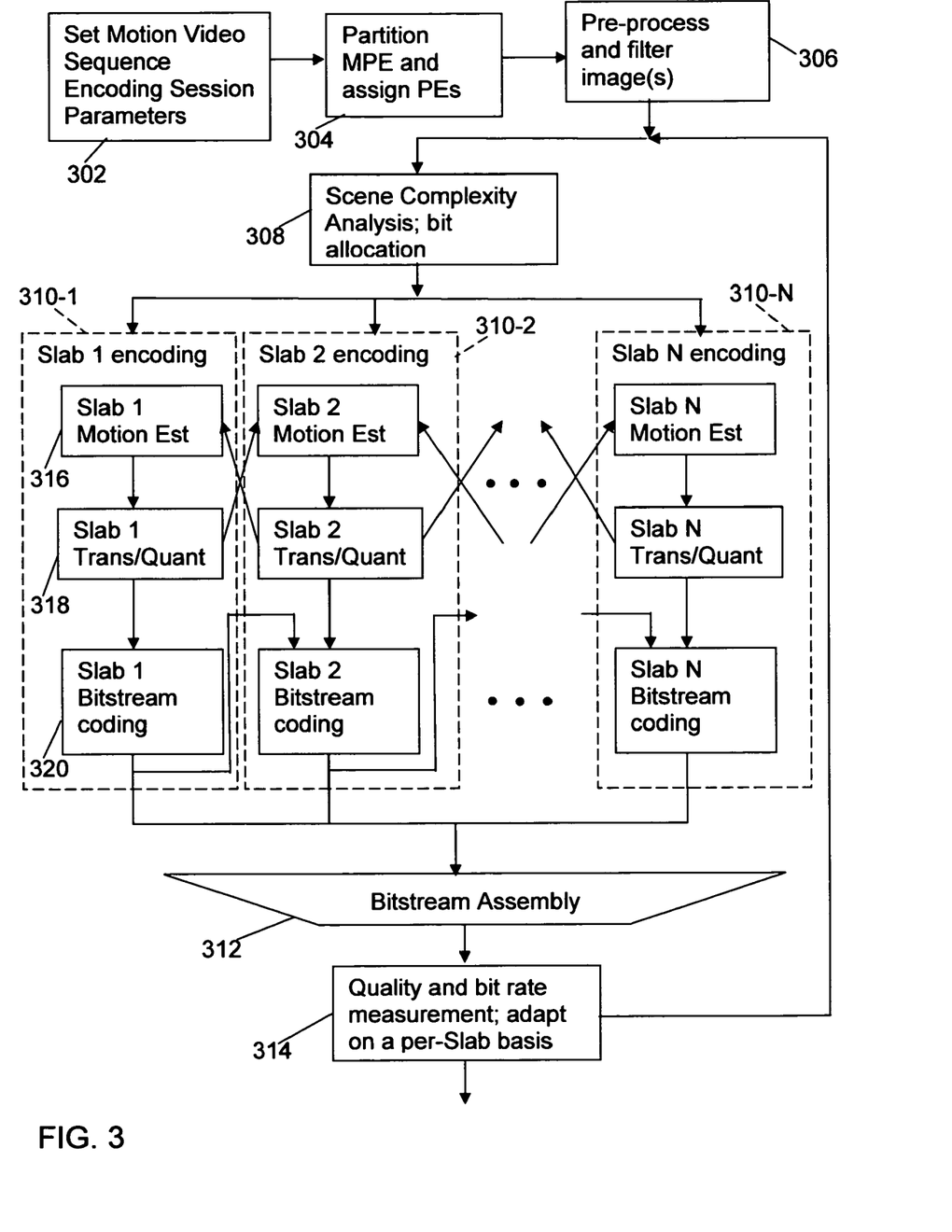
FIG. 3 is a flow diagram of an encoding process.

FIG. 3 is a flow diagram of an encoding process in accordance with Applicants' invention. The process is initialized by setting session parameters for the video bitstream to be encoded (step 302) and then by assigning particular PEs to respective slabs (step 304) based on the parameters. The assignment of PEs to slabs can be considered a partition of the MPE 100 and preferably results from program code executed by a suitable processor, such as one of the PEs, a separate microcontroller, or even a host PC. Session parameters suitable for multi-slab encoding include the number of slabs, their sizes, and their locations, and possibly others, e.g., whether to enable slab-independent quantization, depending on the features desired.

It is often advantageous to condition the input video bitstream by pre-processing and filtering each video frame (step 306). Typical conditioning operations are inverse telecine and color-type conversion, and such conditioning operations may be performed by the FPGAs 106 and memories 110, which thereby operate as co-processors. It will be appreciated, of course, that conditioning (step 306) is not required.

In step 308, the complexity of each frame is analyzed and bits in the bitstream that correspond to each frame are allocated to respective PEs 102. Bit allocation per frame involves the number of bits in an input frame, which can be determined from a target bit rate divided by the frame rate, and the bits/frame are allocated among the plurality of slabs based on the relative complexities of the slabs, e.g., in linear proportion. It is currently preferred, but not required, to perform complexity analysis (and bit allocation) on a frame-by-frame basis, which is to say that quantization changes (and bit allocations) per slab are tracked but are not modified from frame to frame. The complexity of a frame (or slab) is based on the frame size and quantization levels of that frame. Finally, desired quantization levels per slab that meet the constraints for bit-rate control while maximizing visual quality are calculated and passed on to slab encoding sequences 310-1, ..., 310-$n$, ..., 310-N.

Figure 4:
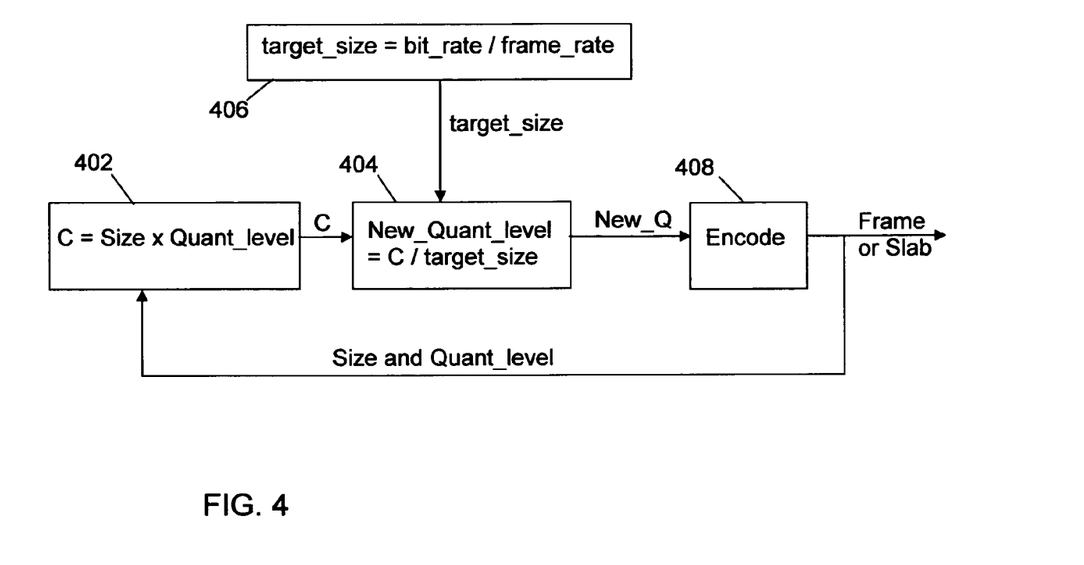
FIG. 4 is a block diagram of a bit-rate control loop.

Quantization levels of frames and slabs may advantageously be determined by a bit-rate control feedback loop, such as that depicted in FIG. 4, which implements a complexity analysis that assumes an exemplary linear relationship among complexity, size, and quantization level. Other relationships may be used. For the linear relationship of FIG. 4, complexity (C) is the product of the size (Size) and the quantization level (Quant_level) (see block 402). In block 404, the quantization level for the next frame or slab (New_Quant_level) is the complexity divided by the target size (target_size), where the target size is given by the bit rate divided by the frame rate (block 406). The new quantization level is used for encoding a frame or slab (block 408), the size and quantization level of which are fed back to block 402.

It will be appreciated that instead of frame-by-frame operation, complexity and bit allocation can be performed in other ways, for example, by dynamically allocating bits among different frame types or by re-allocating bits among slabs based on complexity. In the loop depicted in FIG. 4, such operations are readily implemented as slab-respective variations of the target size. Other ways to perform frame complexity analysis and bit allocation may include dynamic adjustment of the quantization level per macroblock.

The bits allocated to the slabs of an image are then subjected to parallel slab encoding sequences 310-1, 310-2, . . . , 310-N, which are depicted by dashed lines, and the results of each sequence, i.e., a slab bitstream representing each encoded slab, are combined in step 312. As depicted in FIG. 3, the N encoding sequences 310 carry out a chosen encoding algorithm on N image slabs. Assembly of the slab bitstreams generated by the sequences 310 (and thus the slab PEs) is advantageously achieved with negligible overhead. Although depicted in FIG. 3 as a unitary step, the bitstream assembly step 312 may be considered as involving three points in the encoding process.

At the beginning of the coding step 320 for a slab n, a bit offset value from the adjacent slab n−1 is made available to the slab n by, for example, communication from one FPGA to another. If the MPE 100 manipulates data in 8-bit bytes, the bit offset value is a stored integer that ranges from 0 to 7, but it will be appreciated that data may be manipulated in bytes having other sizes and the bit offset value may thus be different accordingly. Since slab bitstreams are not guaranteed to end on byte boundaries, and since not all encoding algorithms allow padding to a byte boundary, the slab-n PE needs to know where the slab-n−1 PE left off. Given the bit offset value, the slab-n PE skips and zeroes out that many bits in its memory (i.e., the slab-n PE pads the first byte) before starting to store bitstream data. At the end of the coding step 320, the slab-n PE makes its bit offset value available to the slab-n+1 PE and zero-pads its final byte to the next byte boundary. To assemble the N slab bitstreams into one bitstream, boundary processing is carried out. Suitable boundary processing may include logical OR operations to combine the (padded) last byte of slab n with the (padded) first byte of slab n+1. It will be appreciated that a bit offset value must be known to be valid before it is used, and so synchronization between slabs may be provided.

The combined bitstream produced by the assembly step 312 is the output of the encoding process. In order to adapt the process to changes in the input video stream, however, the quality and bit rate of the combined bitstream is determined in step 314, and this information is fed back to the complexity analysis and bit allocation step 308. The quality is the same as or at least related to the quantization level, such that the lower the quantization level, the better the perceived quality. Suitable quality parameters are the number of bits and the quantization level used to encode each slab. It will be understood that the quantization level in step 314 may be the same as the quantization level generated in step 308, but this is not necessary; the quantization level within a slab may instead change dynamically, which would yield improved quality. For example, a slab or image area that is "easy to encode", such as a flat field, can be given a higher quantization level (i.e., fewer bits) and yet the same perceived quality can be achieved. The bits saved by using the higher quantization level can be used to encode a more difficult area and improve the quality of the difficult area.

Each encoding sequence 310 includes estimating motion in the respective image slab (step 316), transforming and quantizing the respective image slab (step 318), and encoding the respective transformed and quantized image slab (step 320). It will be understood that these three steps carry out the particular encoding algorithm, such as MPEG-2, WM9, etc., implemented by the method, and thus the PEs are programmed accordingly. Moreover, information is shared between sequences of adjacent slabs as indicated by the arrows in FIG. 3 and as described in more detail below. It will also be appreciated that the encoding sequences 310 may even be executed serially by a suitably fast single processor.

Motion estimation (step 316) is typically done by comparing the image slab of the current frame with the reconstructed image slab of the preceding frame and using shared data from the neighboring slab or slabs. This motion estimation is that specified by the chosen encoding algorithm, and thus for example is substantially the same as MPEG-2 motion estimation when the sequence 310 is doing MPEG-2 encoding and substantially the same as WM9 motion estimation when the sequence 310 is doing WM9 encoding.

Image transformation and quantization (step 318) is done using the image portion in the DSP's memory. The steps performed in image transformation and quantization include the corresponding steps of the particular encoding algorithm, e.g., WM9 or MPEG-2, being implemented by the sequence 310. The shared information needed by this step and the motion estimation step includes the quantization, which is determined from the information provided by the scene complexity analysis (step 308).

Bitstream coding (step 320) is different from the basic coding of the particular algorithm, e.g., MPEG-2 or WM9, being implemented by the sequence 310. WM9 and possibly other algorithms implicitly assume that various coded values are similar at the borders between adjacent macroblocks. Such coded values include motion vectors, quantization coefficients, etc., and a coded value is the difference between the actual value and a "predicted value". WM9, for example, has a predicted value for each macroblock, and each predicted value is based on values from neighboring macroblocks.

Applicants' bitstream coding step 320 advantageously includes boundary processing. For the top slab or top horizontal row of slabs of a frame, the predicted value(s) is/are based on values from the bottom slab or bottom row of slabs of the previous frame. Therefore, the results of step 320 for a slab are sent to the PE handling the neighbor slab before the encoding step 320 starts for the neighbor slab.

It will be appreciated that boundary processing is part of the encoding process 310 carried out by each PE and includes two categories: sharing reconstructed image data between slabs, and sharing coding results between slabs. Thus, boundaries are handled without redundant processing and yet visible artifacts due to image division among parallel processors are avoided. Sharing reconstructed image data, bits consumed per slab, and quantization value used by a previous slab may also be done after the coding step 320. Each slab shares its reconstructed image data with its neighbor slabs.

Those of skill in this art will understand that motion video encoders that use motion estimation (e.g., that generate P- and B-pictures) generate and use reconstructed images (which are also sometimes called reference frames, reference images, and other names) that are necessary for computing motion vectors. An image that is currently being encoded is compared to the reconstructed version of one or more temporally nearby images to compute motion vectors. Reconstructed images are computed by reversing the encoding steps that were used to encode the original image, resulting in duplicates of the images that will be produced when the resulting encoded bitstream is decoded.

It is currently believed that reconstructed image data need be shared only with the immediate neighbors on each side of a slab. It will be seen from FIG. 2A that each slab 202 has only two "sides", i.e., edges where a slab abuts other slabs, and from FIG. 2B that each slab 212 has three sides. It will thus be understood that, depending on the partitioning of an image, a slab or slabs may even have four or more sides, i.e., four or even more edges that are shared with adjacent slabs. Communication is necessary in one direction across all edges to enable assembly of a single bitstream. Communication in both directions across all edges may be provided to support passing of reconstructed image data.

Applicants' encoding methods and apparatus divide an image to be encoded into portions or slabs that are preferably assigned to respective parallel processors having respective independent memories. This facilitates generation of independent encoding parameters for each image portion, yielding substantial improvements in encoding efficiency with granular sub-image control. The images to be encoded can be high-resolution images, such as HD TV, and even higher-resolution images, including image formats such as 30-frame/second interlaced, 720-line progressive at 24, 30, and 60 frames/second, 1080-line interlaced, and 1080-line progressive at 60 frames/second. The parallel processors are programmable and adaptable for processing a portion of an entire image or the entire image. A processor may even handle only a portion of the processing of an entire image, and thus produce intermediate data for utilization by another processor or processors that complete encoding the image.

In addition to dividing images into slabs and allocating slab processing tasks among parallel processors, Applicants' methods and apparatus advantageously include sharing data among the processors and tasks. Data that is communicated between adjacent slab processes falls into two major categories. Some data are necessary for correct computations that result in a valid bitstream; the particular nature of such data is dictated by the chosen encoding algorithm. Other data are optional but enable a lower bit rate and/or better image quality in the resulting bitstream. For example, motion estimation near the edge of a slab can benefit from passing reconstructed image data between adjacent slabs, resulting in a lower bit rate and a reduction or elimination of visible image artifacts near slab boundaries that could occur if reconstructed image data were not shared between adjacent slabs. Another example of optional data are measurements of bits consumed by previously encoded slabs, which can be used to allocate bits in subsequently encoded slabs or images.

Necessary and/or optional data may be communicated in one direction only (e.g., from the slab-n PE to the slab-n+1 PE) or in both directions (from the slab-n PE to the slab-n+1 PE and from the slab-n+1 PE to the slab-n PE). The particular data communicated and the direction of data communication depend on the encoding algorithm implemented, the encoding format parameters, and possible other image processing algorithms in use. The manner by which necessary and/or optional data is communicated between and among PEs is largely determined by the performance (speed) requirements imposed on the encoder and may vary depending on the implementation.

As an example of necessary data for the WM9 encoding algorithm and an image partition as depicted in FIG. 2A, the d.c. coefficients, coded block pattern, and escape code flag for each macroblock in the bottom row of slab n is passed to slab n+1 for I-, P-, and B-pictures. In addition, for P- and B-pictures, the forward motion vectors from the last row of slab n are passed to slab n+1, and for B-pictures, the backward motion vectors from the last row of slab n are passed to slab n+1. Similar information is passed for the MPEG-2 algorithm due to the similarities of MPEG-2 and WM9 noted above. Exemplary optional data includes reconstructed image data, which may be communicated by copying M rows of pixels from the top of slab n to slab n−1 and copying M rows from the bottom of slab n to slab n+1. Suitable values of M may be in the range of $16 \leq M \leq 64$, although it will be appreciated that M can range from 1 to the slab height; the selection of M depends on the encoding algorithm, the motion estimation search range and limits, and encoding performance vs. perceived quality tradeoff.

Applicants MPE is capable of windowed two-pass encoding of high-resolution video in real time. Two-pass encoding uses the current frame's size and the quantization level obtained from a first pass as a predictor of the current frame; single-pass encoding uses the past history of frame sizes and quantization levels as a predictor of the current frame. The PEs 102 perform pre-processing/analysis of HD TV images and provide analysis results to other PEs, which interactively adapt encoding decisions based upon such "look ahead" analysis to improve the resulting encoded (compressed) quality by better "bit allocation" based on the image content and the input encoding parameters. Two-pass encoding affects scene complexity analysis (step 308), and single-pass encoding assumes the complexity of the next frame is similar to the complexity of the current frame. In two-pass encoding, the complexity of each frame is determined in the first pass and the complexity value is then used to calculate the quantization level. A similar arrangement is used to determine the complexity levels of each slab.

Indeed, Applicants' methods and apparatus can be readily implemented for real-time encoding of video images of any resolution. Input video may be live input (e.g., SMPTE 274 or other live input) or stored images provided via any suitable data bus protocol (e.g., Peripheral Component Interconnect (PCI)), and the input can be encoded slower than real time, exactly real time, or even faster than real time.

It will be appreciated that procedures described above may be carried out repetitively as necessary, for example, to respond to time-varying characteristics of a video signal. To facilitate understanding, many aspects of Applicants' invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, Applicants' invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, steps, or components and do not preclude the presence or addition of one or more other features, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of encoding a video signal that includes a succession of images, comprising the steps of:
    separately encoding non-overlapping portions of an image in a video signal according to an encoding algorithm, wherein encoding of each portion of a current image in the video signal is based at least in part on data related to at least one other image portion of the current image; and
    combining the encoded image portions into an encoded video signal representing the entire image;
    wherein encoding an image portion includes receiving a first offset value determined from the encoding of a first neighbor image portion and providing a second offset value determined from encoding the image portion to the encoding of a second neighbor image portion.

2. The method of claim 1, further comprising the step of conditioning each image by at least one of inverse telecine and color-type conversion.

3. The method of claim 1, wherein the encoding algorithm is one of MPEG2, MPEG-4, Windows Media 9, VC9, and VC1.

4. The method of claim 1, wherein the video signal is a high-resolution television signal and the encoding algorithm is one of MPEG-2, MPEG-4, Windows Media 9, VC9, and VC1.

5. The method of claim 1, wherein the step of encoding begins for at least one image portion before beginning for other image portions.

6. The method of claim 1, wherein at least some of the image portions have unequal sizes.

7. A method of encoding a video signal that includes a succession of images, comprising the steps of:
    separately encoding non-overlapping portions of an image in a video signal according to an encoding algorithm, wherein encoding of each portion of a current image in the video signal is based at least in part on data related to at least one other image portion of the current image;
    combining the encoded image portions into an encoded video signal representing the entire image; and
    analyzing a complexity of an image and, based on the complexity analysis, (i) dividing the image into the separately encoded portions, and (ii) assigning at least one quantization level to each image portion, wherein at least one of the image portions is transformed and quantized based on a quantization level of at least one neighboring image portion.

8. The method of claim 7, wherein the complexity of an image portion is based on a size and a quantization level of the image portion.

9. The method of claim 8, wherein the complexity, size, and quantization level are linearly related.

10. The method of claim 8, wherein the quantization level of the image portion is based on a quantization of a preceding corresponding image portion.

11. The method of claim 7, wherein analyzing the complexity of the image includes dynamically allocating bits among image portions based on the complexity.

12. The method of claim 11, wherein bits are dynamically allocated either by varying the sizes of image portions or by varying the quantization lever per macroblock of image portions.

13. The method of claim 7, further comprising the step of determining a quality and a bit rate of the encoded video signal, wherein images are analyzed based on the quality and the bit rate.

14. The method of claim 13, wherein the quality includes a number of bits and a quantization level used in encoding the image portions.

15. A method of encoding a video signal that includes a succession of images, comprising the steps of:
    separately encoding non-overlapping portions of an image in a video signal according to an encoding algorithm, wherein encoding of each portion of a current image in the video signal is based at least in part on data related to at least one other image portion of the current image; and
    combining the encoded image portions into an encoded video signal representing the entire image;
    wherein an image portion is encoded by estimating motion in the image portion, transforming and quantizing the image portion, and encoding the respective transformed and quantized image portion based on necessary data of at least one neighbor image portion.

16. The method of claim 15, wherein estimating motion in the image portion includes comparing the image portion of a current image with a reconstructed image portion of at least one temporally nearby image and using shared reconstructed image data from at least one neighboring image portion.

17. The method of claim 16, further comprising the step of analyzing a complexity of an image, wherein transforming and quantizing an image portion includes using the respective image and information generated by the complexity analyzing step.

18. The method of claim 15, wherein encoding a transformed and quantized image portion includes boundary processing based on the encoding of a neighbor image portion.

19. The method of claim 18, wherein boundary processing includes receiving reconstructed image data of the neighbor image portion.

20. The method of claim 19, wherein boundary processing includes receiving a number of bits consumed per image portion and a quantization value used by a preceding corresponding image portion.

* * * * *